Figure 1:
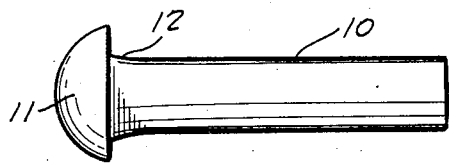

April 5, 1938.  E. C. CROWTHER  2,113,424
SCREW AND LOCK WASHER ASSEMBLY
Filed March 2, 1936  2 Sheets-Sheet 1

Inventor
EDMOND C. CROWTHER
By Joshua R. H. Potts
Attorney

April 5, 1938.  E. C. CROWTHER  2,113,424

SCREW AND LOCK WASHER ASSEMBLY

Filed March 2, 1936   2 Sheets-Sheet 2

Inventor
EDMOND C. CROWTHER.
By Joshua R. H. Potts
Attorney

Patented Apr. 5, 1938

2,113,424

UNITED STATES PATENT OFFICE 2,113,424

SCREW AND LOCK WASHER ASSEMBLY

Edmond C. Crowther, Mount Airy, Pa., assignor to Illinois Tool Works, Chicago, Ill., a corporation of Illinois Application March 2, 1936, Serial No. 66,537

11 Claims. (Cl. 10—73)

This invention relates to threaded fasteners which are commonly known as screws or screw bolts, and is particularly concerned with headed fasteners of this type which have associated with the head thereof a lock washer for preventing unscrewing of the fastener after the same has been threaded home.

At the present time it is common practice in the use of lock washers in conjunction with screw fasteners, to assemble the lock washer manually with the fastener just prior to the screwing-up of the screw. This practice involves a manual operation which is time-consuming, and very often results in the loss of lock washers inasmuch as workers will usually not go to the trouble of picking up a washer after it is dropped, but rather take a new lock washer, this being particularly true where workers are employed on a piece work basis.

With this condition in mind, this invention has in view, as its foremost objective, the provision of a screw fastener with which is assembled a lock washer that is positioned on the fastener just beneath the head thereof.

Present-day manufacture of screw fasteners of the type with which this invention is concerned is characterized by the formation of threads on the stem of the fastener by either one of two methods. One of these is the cut thread method, and it is notable that the outside diameter of the thread of the ultimate product is the same as the diameter of the stem from which the thread is cut. The other, and perhaps more prevalent method of forming threads in the stems of screw fasteners is known as the rolled thread method, in which the stem is subjected to a thread-rolling operation which is effective to form threads therein, and which method is characterized by an extrusion or upsetting of the metal, which results in the outside diameter of the threads of the finished product being greater than the diameter of the stem prior to the thread-rolling operations.

It is this latter rolled-thread method with which this invention is particularly concerned, as this invention proposes availing of this increase in diameter of the threads as a means for holding the lock washer assembled in position beneath the head of a screw fastener.

This invention has in view, as another objective, the provision of a method of forming headed screw fasteners which includes the step of positioning a lock washer beneath the head of a fastener prior to the rolling of the threads in the stem thereof. In carrying out this idea in a practical embodiment, the usual method of manufacturing screw fasteners of this type is followed in that the stem or stock from which the fastener is formed is first upset to provide the head thereon. This head may be non-circular or may be rounded, in which event it is then slotted. At this point in the process, the present invention is followed by then positioning a lock washer about the stem beneath the head, after which the stem is rolled to form the threads which have an outside diameter greater than the original stem, and which will be effective to maintain the washer in assembled position.

Inasmuch as some difficulty is encountered in maintaining the lock washer in position prior to the rolling of the threads, and during the actual rolling thereof, another more detailed object of the present invention is the provision in a method of screw-fastening manufacture, the step of temporarily positioning the lock washer beneath a head. In carrying out this idea in a practical embodiment the stem is enlarged or slightly upset just beneath the head, and the lock washer is placed thereabout with a pressed fit, which serves as a temporary retaining means for positioning the lock washer.

An important object of the present invention is the provision of a screw and washer assembly which includes a lock washer which is maintained assembled beneath the head of the screw fastener by the threads on the stem thereof.

While the present invention is more particularly adaptable for use with lock washers of the so-called twisted-tooth or multiple tooth type, it is susceptible of use with lock washers of any known design. Lock washers of the twisted-tooth or multiple tooth type are characterized as including a main body portion which has faces in parallel planes, and from this main body portion project a plurality of twisted teeth. These twisted-tooth washers are of the internal and external type in that the twisted teeth project either inwardly from the main body portion, or outwardly therefrom, as the case may be.

In the case of the internal type, it becomes important to provide for the extremities of the teeth being free and unobstructed of the threads of the fastener so that they properly bite into the work to provide the desired locking effects. Accordingly, this invention has, as another more detailed objective, the provision of a screw and lock washer assembly in which the lock washer is of the internal twisted-tooth type, and which is held in position beneath the head of a screw by the threads thereof, the washer being provided with a certain required percentage of teeth which are longer than the greater number of such teeth, and which constitute a retaining means for cooperation with the threads.

Other more detailed objects and advantages will in part become apparent and in part be hereinafter stated as the description of the invention proceeds.

The invention, therefore, comprises a screw and lock washer assembly, and method of assembling the same, in which the usual manufacturing method of manufacturing a screw fastener is followed, but with the additional step of positioning a lock washer beneath the head of a fastener prior to rolling of the threads therein, which results in the finished product taking the form of a screw fastener with a lock washer maintained assembled therewith by the threads thereof.

Figure 2:
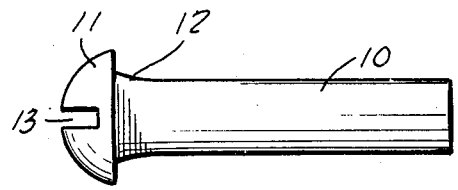
Figure 6:
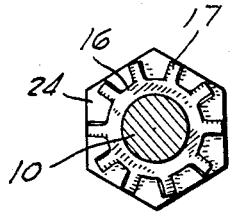
Figure 3:
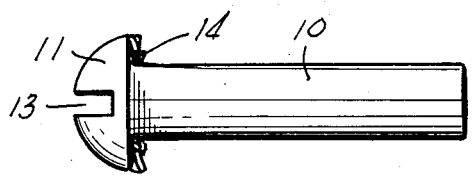
Figure 7:
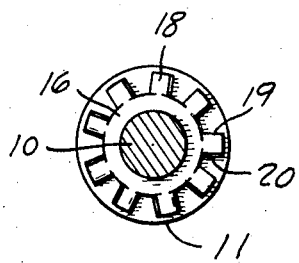
Figure 4:
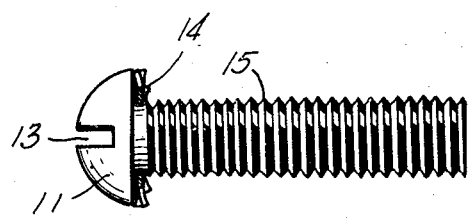
Figure 5:
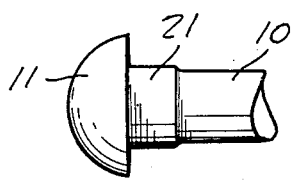
Figure 8:
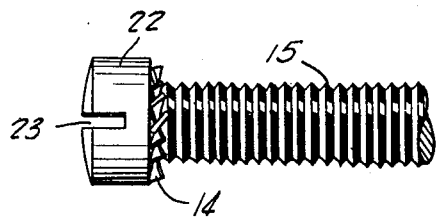

For a full and more complete understanding of the invention, reference may be had to the following description and accompanying drawings, wherein Figure 1 is a view in side elevation, showing a condition of a screw after the first step of the manufacturing method has been followed; this view develops the formation of a head prior to the rolling of the threads therein, Figure 2 brings out the condition of the screw member after the second step of slotting the head has been followed, Figure 3 brings out the positioning of the lock washer, while Figure 4 shows the lock washer as held in position by the threads which have been rolled in the stem, Figure 5 is a fragmentary view of a somewhat modified form of retaining shoulder which may be employed to temporarily hold the lock washer in position, Figure 6 is a transverse section bringing out the construction of one type of twisted-tooth lock washer, while Figure 7 is a similar view bringing out a somewhat different form of the same type of lock washer, Figure 8 is a side view of a somewhat modified form of screw member.

Figure 13:
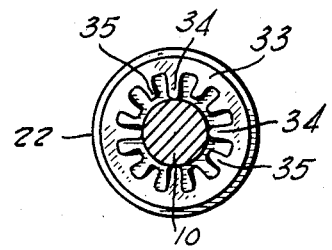
Figure 9:
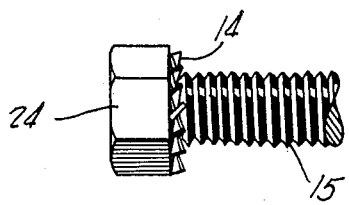
Figure 10:
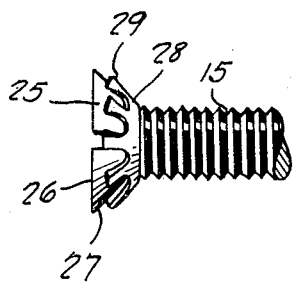
Figure 14:
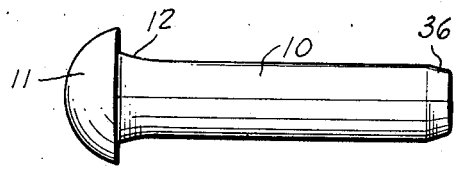
Figure 11:
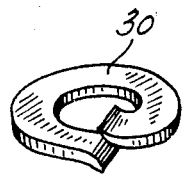
Figure 12:
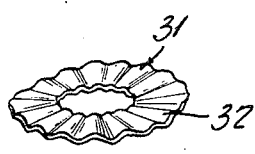

Figure 9 shows another modification of the non-circular type head,

Figure 10 develops the so-called countersunk type of screw,

Figure 11 is a detailed view in perspective of a split ring locking washer, while Figure 12 is a similar view of another type of lock washer which may be employed in accordance with this invention, Figure 13 is a plan view of an internal multiple tooth lock washer which is particularly designed for use in accordance with this invention, and Figure 14 is a view similar to Figure 1, in which the extremity of the screw has been reduced or chamfered at the same time that the head is formed.

Referring now to the drawings, wherein like reference characters denote corresponding parts, Figure 1 develops a fastener in a preliminary process of manufacture thereof. In this view a plain stock or stem 10 is shown as formed with a rounded head 11, which may be fashioned by the usual metal upsetting operations well-known in this art.

At the same time that the head 11 is formed, a tapered or conical shoulder 12 may be formed just beneath the head 11 on the stem 10, this tapered shoulder 12 being graduated in size from the diameter of the stem 10 to a diameter slightly larger than the stem, the purpose of the shoulder 12 being to provide for the temporary retention of the lock washer, as it will be later described, by a pressed fit.

Figure 2 shows the condition of the screw fastener after a slot 13 has been cut in the head thereof. Ordinarily, the manufacturing methods involve the agitation of the fasteners in hoppers prior to passage to the thread-rolling machinery.

Accordingly, it is important that the lock washer be properly retained in position beneath the head 11. While it might be possible, and also practical, to force a lock washer over the entire stem 10 to provide a pressed fit, very accurate machining and dimensioning of parts would have to be followed in order to provide the desired ultimate result, which is a proper positioning of the lock washer beneath the head 11. This invention proposes the obviation of this need for accuracy by availing of the shoulder 12.

Figure 3 shows a lock washer of the external or twisted multiple tooth type as held in position on the shoulder 12 by a pressed fit. This lock washer is referred to in its entirety by the reference character 14. After the lock washer 14 has been positioned in the manner shown in Figure 3, the fastener is fed to a thread-rolling machine which is effective to roll the threads 15 thereon which have a diameter slightly larger than the diameter of the stem 10. At one end the threads 15 engage the main body portion of a lock part 14 to maintain the latter assembled beneath the head 11.

As shown in Figure 6 the lock washer 14 comprises a main body portion 16 which is of a substantially ring-like structure having surfaces in parallel planes and which ring-like structure engages the shoulder 12. Projecting outwardly from the ring-like structure 16 are a plurality of twisted teeth 17 which are affected by tightening up of the screw fastener to provide the desired locking effects. The latter are obtained by the biting of the edges of the teeth into the head 11 and the surface of the work, respectively.

Figure 7 develops a somewhat similar type of external multiple tooth lock washer in which teeth 18 project from the ring-like body portion 16. These teeth 18 are not truly twisted, but the edges thereof are depressed in opposite directions, as indicated at 19 and 20. It is these edges 19 and 20 which bite into the head 11 and the work, respectively.

Referring now to Figure 5, attention is called to the fact that the shoulder 12 may not be tapered or conical, as shown in Figures 1 to 3 inclusive. In actual practice, a cylindrical shoulder 21 may be availed of, which is slightly larger in diameter than the stem 10.

Figure 8 shows a somewhat modified form of screw fastener in which head 22 is shown as being substantially cylindrical in formation and provided with a slot 23.

In Figure 9 still another modification is developed in which a non-circular head 24 is shown as being hexagonal in formation. Obviously, any type of non-circular head could be employed, but it is important to note that when such a head is employed in conjunction with the external type of multiple tooth lock washer, such as that designated in Figure 9 at 14, it is desirable that the smallest diameter of the head be, at least, as great as the diameter across the teeth of the lock washer 14.

Figure 10 shows a type of screw fastener employed when the head thereof is to be countersunk. This head 25 is shown as formed with a flat top 26 and a tapered or conical underside 27 which merges into the threaded stem 15. When the countersunk type of screw is employed, the lock washer associated therewith must be complemental to the conical surface 27. As shown in Figure 10, a lock washer 28 is shown as formed with twisted teeth 29 that conform to the taper of the head 25.

Figure 11 develops in perspective a lock washer 30 of the so-called split ring type. Such a lock washer is also susceptible of being maintained assembled beneath the head of a screw fastener, in accordance with the teachings of this invention. Likewise, the lock washer shown in Figure 12, and designated 31, may also be assembled with a headed screw fastener by the methods hereof. This washer 31 is shown as being of a wave-like construction, which may be provided with projections at 32 for biting into the work.

Figure 13 brings out the internal type of multiple tooth washer which comprises an exterior ring-like body portion 33 which is formed with a small number of long, inwardly projecting teeth 34. In Figure 13 the washer is shown as provided with four of these long teeth 34. Intermediate the long teeth 34 are a plurality of twisting locking teeth 35 which extend only to a point approximately equal to the outside edges of the threads 15 on the stem of the fastener.

When this arrangement is followed, the corners of the inner edges of the twisted teeth 35 are positioned for freely biting engagement with the work, into which the screw is threaded.

Referring now to Figure 14 the stem 10 is shown with a reduced portion or chamfer 36 that is preferably formed at the same time as the head 11 and shoulder 12. This chamfer 36 has the function of facilitating the passage of the lock washers 14 over the stem 10, and in the finished product aids in the initial threading operations by insuring of proper threading engagement.

While preferred specific embodiments of the invention are hereinbefore set forth, it is to be understood that I am not to be limited to the exact constructions and methods illustrated and described, because various details of these modifications may be provided in putting the invention into practice, within the purview of the appended claims.

I claim:—

1. A screw and lock washer assembly of the character described comprising a threaded stem formed with a head, and a lock washer of the internal twisted-tooth type assembled beneath the said head, said lock washer having a plurality of twisted teeth, the extremities of which are free from the threads on the stem, and additional teeth which engage the threads on a stem to maintain the washer in assembled relation therewith.

2. The method of assembling a lock washer on a screw fastener which consists in first forming a stock of metal with a head and a shoulder slightly larger in diameter than the stem of the stock, positioning a lock washer over said shoulder by a pressed fit, and then rolling threads on the stem.

3. The method of assembling a lock washer on a screw fastener which consists in first upsetting a stock of metal to form a head thereon and a stem with a tapered shoulder on the stem adjacent the head, positioning a lock washer on said tapered shoulder by a pressed fit, and then rolling threads on the stem.

4. A screw and lock washer assembly including a threaded stem formed with a head, and a lock washer having an annular body portion and internal marginal prongs providing work engaging elements projecting from opposite sides of said body, the inner extremities of said prongs being disposed from the center of the screw a distance sufficient to prevent interference with the screw thread, and means on said lock washer projecting inwardly beyond the inner extremities of said prongs for maintaining said prongs in operative relation with respect to the underside of the screw head.

5. The method of assembling a lock washer on a screw fastener which consists in positioning a lock washer on an unthreaded stem adjacent the clamping surface of a screw head, maintaining the lock washer in said position, and rolling a thread on the stem while the lock washer is being maintained in said position whereby to provide a thread in the vicinity of the lock washer which extends radially outward beyond the inner confines of the lock washer.

6. The method of assembling a lock washer on a screw fastener which consists in positioning a lock washer on an unthreaded stem adjacent the clamping surface of a screw head, engaging the lock washer with the stem structure to hold it in proper position, and then rolling a thread on the stem while the lock washer is being held in said position whereby to provide a thread in the vicinity of the lock washer which extends radially outward beyond the inner confines of the lock washer.

7. A screw and lock washer assembly including a stem having a rolled thread and formed with a head, and a lock washer including a body portion and a plurality of internal marginal teeth projecting in opposite directions out of the plane of the washer body, the rolled thread in the immediate vicinity of the lock washer being of sufficient diameter to prevent axial displacement of the washer, said internal teeth being free to lockingly engage the clamping side of the screw head and the work surface when clamped in position in response to rotation of the screw.

8. A screw and lock washer assembly including a stem having a rolled thread and formed with a head, said head presenting a clamping surface extending laterally outward from the threaded stem, and a lock washer of spring stock positioned adjacent said clamping surface, said lock washer including a body portion, external sections of the washer stock along the outer margin of said body portion being deflected so as to present oppositely disposed marginal teeth projecting in opposite directions beyond said body portion, the inner diameter of said lock washer being sufficiently less than the external diameter of the threaded stem to render the thread in the immediate vicinity of the lock washer operable to prevent axial displacement of the washer and to present said external marginal teeth in operative relation with respect to the clamping surface of the screw head.

9. A screw and lock washer assembly including a stem having a rolled thread and formed with a head, said head presenting a clamping surface extending laterally outward from the threaded stem, and a lock washer of spring stock positioned adjacent said clamping surface, said lock washer including a body portion, sections of the washer stock along at least one of the margins of said body portion presenting a plurality of marginal locking elements, each element being configurated so as to present oppositely disposed marginal teeth projecting in opposite directions beyond said body portion, the inner diameter of said lock washer being sufficiently less than the external diameter of the threaded stem to render the thread in the immediate vicinity of the lock washer operable to prevent axial displacement of the washer and to give maximum tooth engagement of washer with screw head for minimum overall washer diameter.

10. A screw and lock washer assembly including a stem having an extruded thread and formed with a head, said head presenting a clamping surface extending laterally outward from the threaded stem, and a lock washer of spring stock positioned adjacent said clamping surface, said lock washer including a body portion and resilient projections positioned to bite into the screw head and work in an annular area concentric with the screw and located between the outer diameter of the screw thread and the periphery of the screw head, the inner diameter of said lock washer being sufficiently less than the external diameter of the threaded stem to render the thread in the immediate vicinity of the lock washer operable to prevent axial displacement thereof.

11. A screw and lock washer assembly including a stem having an extruded thread and formed with a head, said head presenting a clamping surface extending laterally outward from the threaded stem, and a lock washer of spring stock positioned adjacent said clamping surface, said lock washer including a body portion and resilient projections positioned to bite into the screw head and work in an annular area concentric with the screw and located between the outer diameter of the screw thread and the periphery of the screw head, the inner diameter of said lock washer being sufficiently less than the external diameter of the threaded stem to render the thread in the immediate vicinity of the lock washer operable to prevent axial displacement thereof, the external diameter of said lock washer being no greater than the external diameter of the screw head.

EDMOND C. CROWTHER.